Aug. 22, 1961 J. H. TAYLOR 2,997,116
TRACTOR ATTACHED HARROW
Filed Feb. 26, 1958 2 Sheets-Sheet 1

INVENTOR
JOSEPH H. TAYLOR
BY
*Lamont Johnston*
ATTORNEY

Aug. 22, 1961  J. H. TAYLOR  2,997,116
TRACTOR ATTACHED HARROW
Filed Feb. 26, 1958  2 Sheets-Sheet 2

INVENTOR
JOSEPH H. TAYLOR
BY
*Lamont Johnston*
ATTORNEY

2,997,116
TRACTOR ATTACHED HARROW
Joseph H. Taylor, Athens, Tenn.
Filed Feb. 26, 1958, Ser. No. 717,603
4 Claims. (Cl. 172—239)

This invention relates to a harrow and more particularly to a tandem disk harrow adapted to be connected to a tractor having a power lift mechanism in such a manner that the front and rear sections of disk gangs may engage the ground at different levels and yet both front and rear disk gangs are forced into the ground to substantially equal depths below its surface.

In previously made tractor-attached tandem disk harrows, the harrow frames have been attached to the tractor in a rigid manner, so that the front and rear disk gangs do not break up the ground uniformly when the harrow is being used over rough land having an unlevel surface. For example, such harrows do not provide even breaking up of the ground when they are used across land which is terraced to the contour of a hill, or across middle furrows, seams or ridges. In tandem harrows heretofore in use, the front and rear gang sections of harrows are not so connected to each other that they take equal bites into the earth when they are passing over land having alternating ridges and furrows. When either of the front or rear sections of the harrow passes over a relatively high ridge, the entire harrow is lifted to the extent that the other section takes very little or no bite in the relatively lower surface of the earth over which it is passing.

One object of this invention is to provide a tandem disk harrow adapted to be connected to a tractor having a power lift mechanism in such a manner that the longitudinal axis of the main frame of the harrow is tiltable to permit the front and rear sections of disks gangs to engage the ground at different levels, while both front and rear sections of the disk gangs are forced into the ground to substantially equal depths below its surface.

Another object is to provide such a harrow in which the connection to the tractor is so adjustable as to exert more or less downward force upon either the front or rear disk gang sections, as is necessary on account of the conditions of the soil being prepared.

A further object is to provide such a harrow in which each of the front pair of disk gangs is tiltable with respect to the main frame between preset limits independently of the other front disk gang.

Still another object is to provide such a harrow in which each of the rear disk gangs is tiltable with respect to the main frame within preset limits conjointly with the other rear disk gang.

Other advantages of the invention will be apparent from the following description, taken in conjunction with the accompanying drawings, in which.

Figure 2:
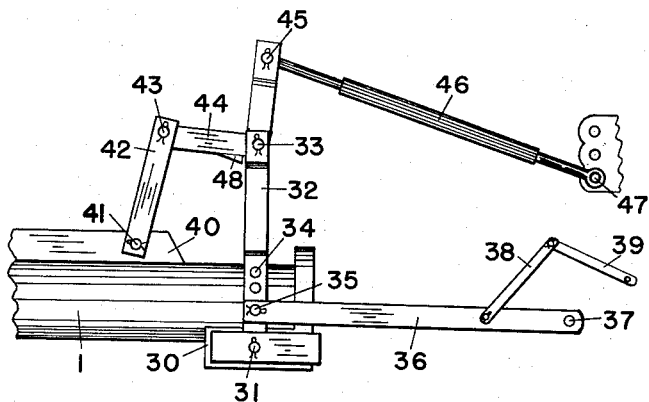
FIG. 2 is an enlarged partial view in side elevation, showing the positions of the linkage parts as attached to a tractor when both front and rear sections of disk gangs are on level ground.
Figure 1:
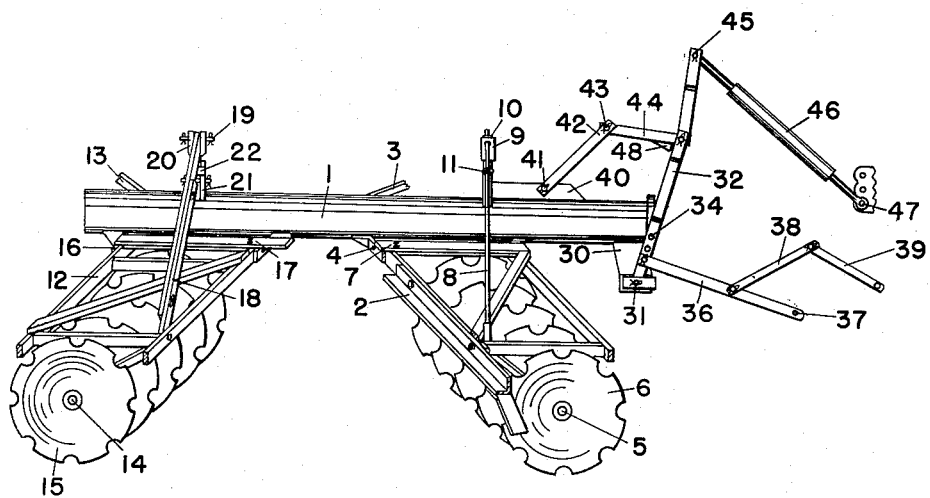
FIG. 1 is a perspective view of a harrow made in accordance with the invention.
Figure 3:
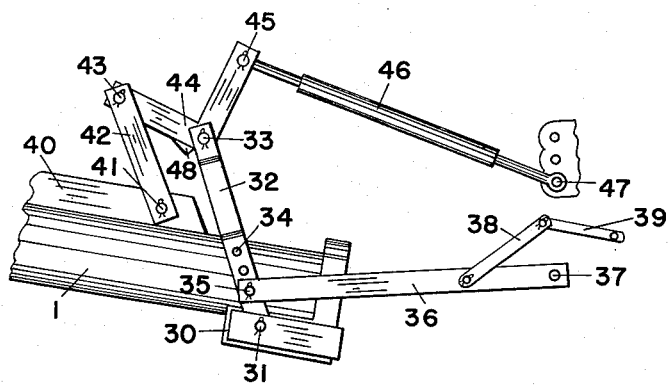
Figure 4:
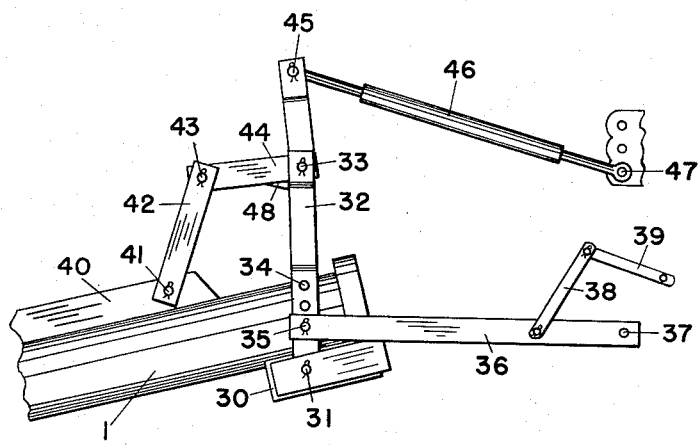

FIG. 3 is an enlarged partial view similar to FIG. 2, showing the positions of the linkage parts as attached to a tractor when the front section of disk gangs is substantially lower than the rear section of disk gangs; and FIG. 4 is an enlarged partial view similar to FIGS. 2 and 3, showing the positions of the linkage parts as attached to a tractor when the front section of disk gangs is substantially higher than the rear section of disk gangs.

In the drawings, the harrow comprises a longitudinal main frame 1, to which are attached front section frames 2 and 3, these frames being pivotally connected to the main frame, as at 4. Each of the front section frames supports rotatably upon an axle 5 a gang of harrow disks 6, which may preferably be concave in shape and have scalloped edges. The front section frames are preferably set at an angle forward of a line transverse to the main frame 1, the particular angle being adjustable by means of a pin and a series of openings, as at 7, to suit the particular conditions of soil being treated. The disks on each side of the front section preferably have their concavities turned outwardly, so that, as they are drawn forward by a tractor on the axles 5, angled forward of a transverse line, they tend to force the soil outwardly as they dig into it and force is exerted inwardly on the front section harrow gangs toward the main frame 1. To the outer end of each of the front section frames 2 and 3, there is pivotally attached a rod 8 extending upwardly and inwardly through an opening in a plate 9 fixed to and projecting upwardly from the main frame 1. Onto the inner end of each rod 8 there is screwed a nut 10 which abuts against the plate 9 and limits the outward movement of the rod 8, thereby limiting the downward movement of the front section frames 2 and 3, so that said frames are not permitted to go below a horizontal position. The rod 8 is slidable within the opening in the plate 9 and a collar 11 is attached thereto in a fixed position a few inches outwardly of the nut 10, thereby permitting the front section frames 2 and 3 to be lifted until the collar 11 abuts against the plate 9, thus limiting the amount of upward movement of the front section frames 2 and 3. It will be noted that each of the front section frames 2 and 3 is provided with a rod 8, a plate 9, a nut 10 and a collar 11, which is entirely separate from and unconnected with the same parts on the other side of the front section, so that each of these sides of the front section may pivot upwardly independently of the other side of the front section.

Behind the front section, there is a rear section comprising two rear section frames 12 and 13. Each rear section frame 12 and 13 supports an axle 14 on which are journaled a plurality of concave, scalloped, harrow disks 15. Each of the rear section frames 12 and 13 is pivotally attached to the main frame 1 at 16. The rear sections ar preferably attached to the main frames at angles behind a line transverse to the main frame 1, these angles being determined by pins inserted through adjustment holes 17, as determined by the condition of the soil being treated. To the outer end of each of the rear section frames 12 and 13, there is pivotally attached a connecting rod 18 extending upwardly and inwardly toward and above the main frame 1. In this case, each of the connecting rods 18 is pivotally attached by the same pivot pin 19 to a rocker arm 20 pivoted to and extending upwardly from the main frame 1. The rocker arm is oscillatable transversely within a frame 21 comprising front and rear plates and side plates or keepers 22, which limit the outward rotation in both directions of the rocker arm 20. Thus, it will be apparent that the rear section frames 12 and 13 are pivotally attached to each other through the connecting rods 18 and the pin 19 and each rear section frame and its disk gang pivots conjointly with the other rear section frame and its disk gang. In this case, the concavity of the harrow disk is preferably turned inwardly so that, since the rear section frames extend behind a line transverse to the main frame, the disks bite into the earth and force it inwardly, tending to draw each of the rear sections outwardly. Due to the front section disks forcing the dirt outwardly and the rear section disk forcing it inwardly, a thorough breaking up of the dirt is accomplished.

To the front of the main frame 1 there is attached a transverse frame member 30 housing transverse axles 31 at each end. Pivotally attached to each axle 31 are the ends of a tractor connector or yoke 32, extending upwardly from the axles and carrying at its central apex a pivot pin 33. Intermediate the axles 31 and the apex pin 33, there are provided in the yoke 32 a plurality of adjustment holes 34 in which a pivot pin 35 is inserted for pivotally attaching to the yoke on each side one of the traction and lifting arms 36 extending rearwardly from a tractor, not shown. Each traction and lifting arm 36 is pivotally attached at 37 to the tractor. Intermediate its ends, there is attached to each traction and lifting arm 36 a linkage 38, 39, extending from the tractor, this linkage transmitting power from the tractor for lifting the entire mechanism, including the whole harrow, when desired, in a manner well known in the art.

To the upper surface of the main frame 1, there is attached an upwardly extending rib or fin 40, to which is pivotally attached at a pivot 41 a link 42. The other end of the link 42 is pivotally attached at 43 to one arm of a bell crank 44, whose fulcrum is pivotally attached to the apex pivot 33 of the yoke 32. The other arm of the bell crank 44 is pivotally attached at 45 to the tractor through an upper link or draft control rod 46, pivoted at 47 to the tractor body. A stop member 48 is attached to the lower surface of one arm of the bell crank 44 in a position to abut against the yoke 32 to limit the rearward rotation of the bell crank 44 relative to the yoke.

The operation of the upper link or draft control rod 46 is well known in the art, this upper link being adjustable in length by means of a turnbuckle. Its primary function in some types of tractors is ordinarily to cause a hydraulic mechanism in the tractor to lift the harrow automatically, through the linkage 38, 39 and the traction and lifting arms 36, when the harrow has sunk too deep in the soil, the lifting being instantaneously released after the harrow has been lifted out of the soil.

In the operation of this invention, when the harrow is on level ground, as illustrated in FIG. 2, the traction arms 36 extending rearwardly from the tractor exert their pull through the pivot pins 35 attached in one set of the adjustment holes 34 in the yoke 32. This differs from harrows now in use in which the traction arms 36 are connected directly to the axles 31 on the transverse frame member 30. Since, in this invention, the traction is not directly through the traction arms 36 to the axles 31, but they are connected to the yoke 32, a means is provided for compensating for different levels of the front and rear sections of disk gangs of the tractor. The traction arms 36, acting through the pivots 35 on the yoke 32, tend to rotate the yoke forwardly about the axles 31 as an axis. This motion, in turn, tends to move the pivot 33, on which the bell crank 44 is fulcrummed, forwardly. Movement of the bell crank forwardly is resisted by the upper link or draft control rod 46, to which the upper arm of the bell crank is pivoted at 45. This causes the bell crank to tend to rotate in a rearward, or counter-clockwise, direction, as seen in the drawings. Such rotation then causes the link 42 to the forced downwardly, through the pivot 43, and to exert downward force on the fin 40 and the main frame 1, through the pivot 41. Since the pivot 41 is to the rear of the axles 31, but forward of both the front and rear sections of disk gangs, there is a downward force through the link 42 on the main frame 1 and on both front and rear sections of disk gangs. Thus, both front and rear disk gang sections are forced downwardly into the soil.

When the front section of disk gangs becomes lower than the rear section, as illustrated in FIG. 3, as, for example, when the front section of disk gangs passes into a gulley or the rear section is passing over a ridge, the linkage nevertheless provides substantially equal force downwardly on both front and rear sections of disk gangs. In this instance, the yoke 32 becomes rotated rearwardly, about the axles 31 as an axis, due to the tilting of the main frame downwardly in the front, the apex pivot 33 of the yoke carrying the bell crank 44 rearwardly. The traction arms 36 always pull on and tend to rotate the yoke 32 about the axles 31 and to pull the bell crank 44 forwardly through the apex pivot 33 of the yoke. This forward movement of the bell crank being resisted by the upper link or draft control rod 46, the tendency of the force on the yoke 32 is to rotate the bell crank rearwardly and to exert force through the pivot 43, the link 42 and the pivot 41 to the fin 40 and the main frame 1. As the pivot 41 is to the rear of the axles 31, the net effect of the downward force on the pivot pin 41 is to tend to rotate the main frame 1 downwardly at the rear and thus to maintain an even force downwardly on the rear section of disk gangs, as well as on the front section of disk gangs, in order that both sections of disk gangs may be forced into the earth a susbtantially equal amount, regardless of the fact that the front section is at a lower level than the rear level.

When the front section of disk gangs is at a level higher than that of the rear section of disk gangs, as illustrated in FIG. 4, there is a similar action. As before, the traction arms 36 tend to rotate the yoke 32 forwardly about the axles 31 as an axis and thus to pull the bell crank 44 forwardly with the apex pivot 33 of the yoke. Such forward movement of the bell crank being resisted by the upper link or draft control rod 46, the tendency of the forward movement of the yoke is to rotate the bell crank rearwardly, about the pivot 33 as an axis, and to exert force through the pivot 43, the link 42 and pivot 41 down onto the fin 40 and the main frame 1. The pivot 41 being to the rear of the axles 31, the net effect of this force through the linkage is to tend to rotate the main frame 1 downwardly at the rear, thus exerting force on the rear section of disk gangs and causing it to engage the earth to substantially the same depth as does the front section of disk gangs.

The stop member 48 on bell crank 44 limits the amount of rearward rotation of the bell crank relative to the yoke 32, as when the front section of disk gangs is at a level substantially higher than the level of the rear section of the disk gangs, as illustrated in FIG. 4. Nevertheless, the principal function of the stop member 48 is to hold the main frame 1 and the attached harrow sections in a level position when the entire assembly is lifted through the linkage 38, 39 and the traction and lifting arms 36 of the tractor, as when moving the harrow from one position to another.

As has been indicated, the connection for the traction and lifting arms 36 to the harrow is made through a series of holes 34 in the yoke 32. These holes are provided in order to make possible the adjusting of the draft pins 35 so as to exert more or less downward force upon the front or rear sections of disk gangs, as may become necessary on account of conditions of the soil being prepared, which the operator can easily detect.

This invention provides a very flexible means for attaching a harrow to a tractor. It constitutes an equalizing device which places the right amount of force on both the front and rear sections of the harrow. This automatically calls for the harrow to do a more level even-depth job of work and also eliminates any undue strain on the tractor. It causes much less strain on the operator and on the tractor's steering mechanism, since the harrow is permitted to go below the level of the wheels of the tractor or above the level of the tractor's wheels.

This invention provides a harrow which is designed to go over rough ground having unlevel surfaces, such as middle furrows and seams, or ridges. It causes the harrow to follow the contour of the ground, such as where the ground is terraced on a hilly slope.

Through the flexible lateral adjustments of the disk gangs of the front and rear sections, which gangs can pivot freely relative to the main frame, a satisfactory job of work can be done even though it is necessary to drive the harrow at diagonals of any degree across ridges, or beds. The hinging effects of the front and rear sections allow each gang in the front and rear sections to conform to the variations in soil levels encountered in such use. The hinges connecting the gangs to the main frame automatically adjust themselves to the contour changes of the beds, or ridges, being crossed.

It will be apparent to those skilled in the art that various changes may be made in the invention without departing from the spirit and scope thereof and therefore the invention is not limited by that which is shown in the drawings and described in the specification, but only as indicated in the appended claims.

I claim:

1. In a tandem disk harrow drawn by a tractor having a pair of traction arms and a draft control rod, a longitudinal main frame, a transverse frame member attached to the forward end of the main frame, aligned pivots at each end of said transverse member, a yoke pivotally attached to said transverse member at said pivots and extending upwardly therefrom to an apex, a pivot at the apex of said yoke, a bell crank fulcrumed at the apex pivot of said yoke and having one arm pivotally attached to the draft control rod of the tractor, aligned pivots on said yoke between said apex pivot and the pivotal attachment of said yoke to said transverse member to which the traction arms of the tractor are attached, said bell crank having a stop member abutting against said yoke to limit the rearward rotation of said bell crank relative to said yoke, and a link pivotally connected at one end to the other arm of said bell crank and at the other end to the main frame, the draft on said traction arms of the tractor tending to rotate said yoke forwardly on said transverse member pivots and coacting with said draft control rod of the tractor to force said main frame downwardly through said bell crank and said link.

2. The invention according to claim 1 in which there is a plurality of aligned pivots on each side of the yoke between the apex pivot and the pivotal attachment of the yoke to the transverse member.

3. The invention according to claim 1 in which the harrow has a pair of front disk gangs and a pair of rear disk gangs, each front disk gang being pivotally attached to the main frame on a longitudinal axis having means attached thereto to limit its pivoting on said axis and is freely tiltable on said axis between the limits imposed by said means independently of the other front disk gang.

4. The invention according to claim 1 in which the harrow has a pair of rear disk gangs, each rear disk gang being pivotally attached to the main frame on a separate longitudinal axis and being connected with the other disk gang by connecting rods pivotally attached to said rear disk gangs and to each other to make each rear disk gang freely tiltable on said axis conjointly with the other rear disk gang.

References Cited in the file of this patent
UNITED STATES PATENTS

| | | |
|---|---|---|
| 2,266,590 | Dyrr | Dec. 16, 1941 |
| 2,337,801 | Cook | Dec. 28, 1943 |
| 2,385,637 | Mitchell et al. | Sept. 25, 1945 |
| 2,646,657 | Robertson | July 28, 1953 |
| 2,649,721 | Spedding | Aug. 25, 1953 |
| 2,663,239 | Rapp et al. | Dec. 22, 1953 |
| 2,694,279 | Nelson | Nov. 16, 1954 |
| 2,718,183 | Todd | Sept. 20, 1955 |
| 2,784,657 | Newkirk | Mar. 12, 1957 |
| 2,813,389 | Padrick | Nov. 19, 1957 |
| 2,822,628 | Arps et al. | Feb. 11, 1958 |
| 2,822,739 | Altgelt | Feb. 11, 1958 |